March 5, 1929.  E. T. RUSHTON  1,704,628
RIM TOOL
Filed April 2, 1928
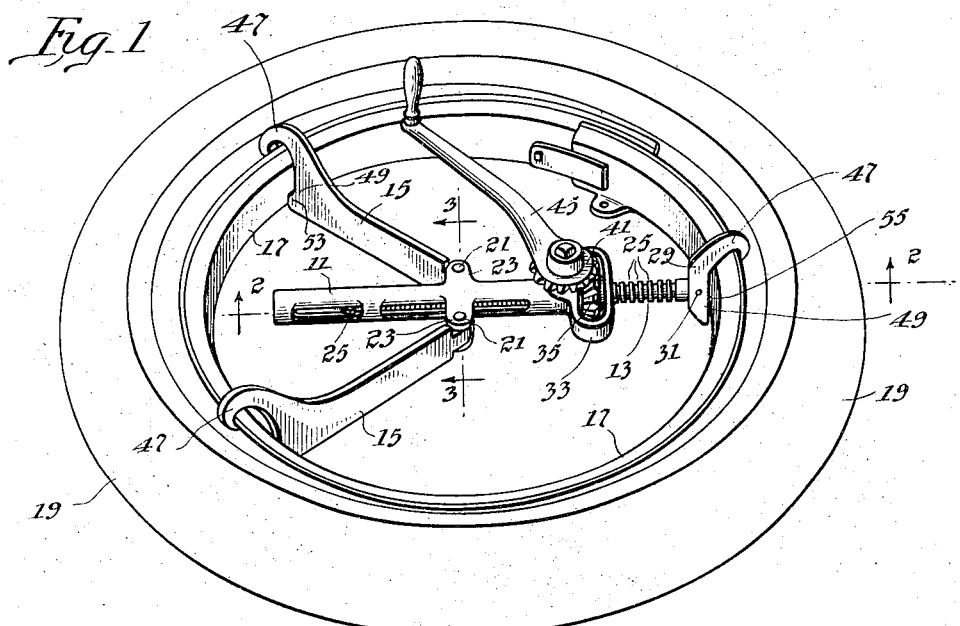
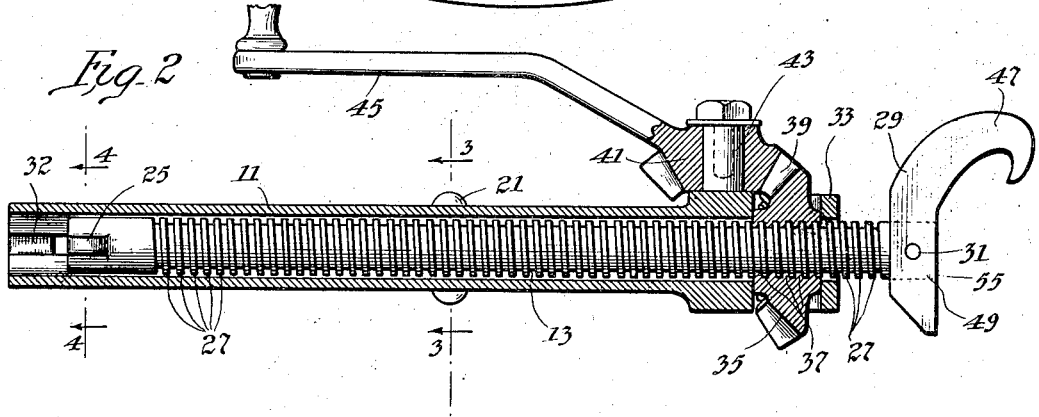
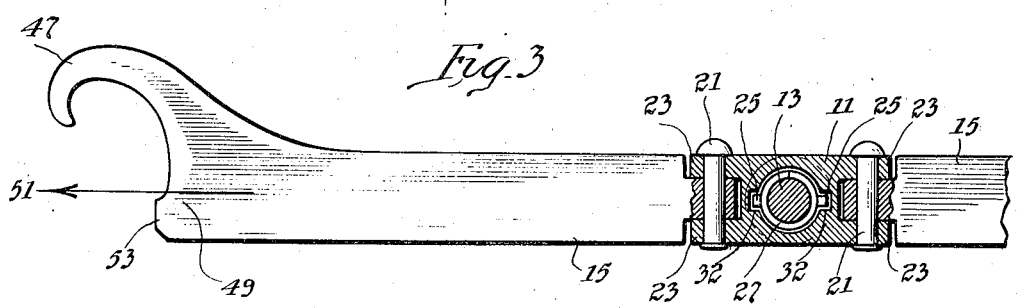
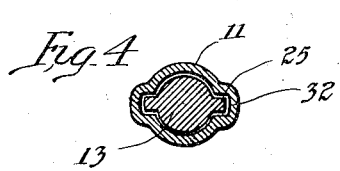
Inventor:
Elmer T. Rushton
By Cheever & Cox
Attys.

Patented Mar. 5, 1929.

1,704,628

UNITED STATES PATENT OFFICE.

ELMER T. RUSHTON, OF ST. JOSEPH, MICHIGAN, ASSIGNOR TO HERCULES PRODUCTS COMPANY, OF ST. JOSEPH, MICHIGAN, A CORPORATION OF MICHIGAN.

RIM TOOL.

Application filed April 2, 1928. Serial No. 266,597.

My invention relates in general to a wheel-rim tool for manipulating split wheel-rims to facilitate the mounting of tires and has more particular reference to a rim tool having various improvements in the form and arrangement of the parts whereby a single tool may be used to manipulate any size of wheel-rim, within the range of wheel sizes at present utilized in the automotive art, without adjustment of the parts.

Among the important objects of my invention is to provide a rim tool having rim engaging arms set upon the frame or body of the tool in such a position as to utilize the extensibility of the tool to best advantage, so that the tool may be used to manipulate rims of various diameter throughout a wide range, that is to say, my object is to provide a universal rim-tool.

Numerous other objects and advantages of the invention will be apparent as it is more fully understood from the following description which taken in connection with the accompanying drawings discloses a preferred embodiment of my invention.

Referring to the drawings:

Figure 1 is a perspective view of a tire tool embodying my invention as applied in manipulating an automobile wheel rim;

Figure 2 is a vertical section taken longitudinally through the body of the device and substantially along line 2—2 of Figure 1;

Figure 3 is a vertical section taken substantially along the line 3—3 in Figure 2; and Figure 4 is a vertical section taken substantially along the line 4—4 in Figure 2.

To illustrate my invention I have shown on the drawings a tire tool comprising a frame or housing 11, an extensible member 13 enclosed within the housing and adapted to project therefrom, and rim engaging arms 15 pivotally mounted to the body. In Figure 1, I have shown the tool as arranged in position to manipulate a wheel rim 17 carrying a tire 19.

In order to secure the numerous advantages hereinbefore and hereinafter pointed out, as well as other advantages not specifically enumerated herein, I permanently pivot the rim-engaged arms 15 to the housing 11, preferably by means of pins 21 secured in ears 23 preferably formed integral with the housing. And the numerous advantages spoken of are derived from locating these pivotal pins at points on the housing intermediate, between, or spaced from its ends. In the particular embodiment of my invention illustrated in the drawing I have shown these pivoted pins 21 as being positioned substantially at the middle section of the housing, that is, substantially midway of its length.

By reason of my construction I am thus enabled to use a slightly longer sleeve or housing 11 and extensible screw 13 in my improved tool and at the same time I am enabled to keep the pivoted arms where they hinge to the tool close enough to the center of any size rim to let the tool operate on substantially all sizes of rims without having the arms swing around under strain. It will be understood that in addition to the foregoing the extensibility of my tool depends upon the effective length of the inclosing sleeve or housing which may be utilized as a guide to prevent the relative rotation of the extensible member as it is being projected. For instance, if a short sleeve is used, the extensible member can be projected only a relatively short distance, because the length of the grooves 32 in the sleeve, in which the ears at the lower end of the extensible member engage, limits the extension of the member. In order to obtain a relatively long range, a long sleeve must be provided, but if a long sleeve is provided in the manner taught by the prior art the device will not operate satisfactorily upon small diameter rims. If, on the other hand, the tool has a relatively short sleeve, it will not satisfactorily operate on large diameter rims. However, in my invention, I have provided a universal tool, that is, one which will adjust itself to practically every size of rim by providing a housing and extensible screw of the necessary length, and by permanently pivoting the rim-engaging arms 15 intermediate the length of the housing, and by forming cooperating means in the sleeve or housing and the extensible member for preventing rotation of the member in the sleeve throughout the entire range of extensibility of the member. By means of this simple unitary construction I produce a single rim tool capable of handling substantially all sizes of rims without resorting to arm adjusting attachments or devices and also eliminates the necessity of using different sizes of rim tools for the variant sizes of rims.

In the preferred embodiment illustrated, the extensible member 11 comprises a shaft having a head formed with outstanding ears 25 at one extreme end, and having screw threads 27 formed therein from adjacent said end throughout its remaining portions. The shaft carries a rim engaging portion 29 secured to its opposite end by means of a pin 31.

The housing 11 forms a sleeve in which the member 13 may slide longitudinally and the sleeve is provided with longitudinal grooves 32 in which the ears 25 may slidingly engage to prevent the shaft from rotating relatively to the housing. It will be noticed that I also provide the housing with lateral openings which are in line with the longitudinal grooves 32, whereby to provide two functions; first, the openings considerably lighten the tool for use in handling, and in addition, they permit the lateral ears 25 on the extensible threaded member to engage the edges of the openings so as to prevent rotation of the extensible threaded member. In other words, these lateral openings have the same function as the grooves 32. The housing is provided at its upper end with a loop 33 extending across the sleeve and having an opening through which the member 13 may freely slide. This loop is for the purpose of retaining an operating member preferably in the form of a bevel gear 35, having internal threads 37 adapted to cooperate with the threads 27 of the member 13, in position to project the member 13 from or to retract the member 13 into the housing, the gear 35 being revolubly held by the loop against the end of the housing. The toothed periphery 39 of the bevel gear 35 extends outwardly beyond the sides of the housing in position to make driving connection means for rotating the gear 35, which in the present instance comprises a bevel gear 41 pivoted on a pin 43 mounted in the housing, and having an operating arm and handle 45 by which the gears may be rotated in order to move the member 13 longitudinally in the housing.

The arms 15 being pivoted to the housing 11, may, when the device is not in use, be folded up parallel thereto in order to provide a compactly collapsible tool. The arms however may be easily opened up to the position shown in Figure 1 in order to place the tool in position to operate upon a wheel gaging portion 29, carried by the shaft 13, in a novel manner. Each of these parts is formed with an offset claw or hook 47 extending outwardly to engage the edge of the wheel rim and adapted to exert an off-center pull when the device is operating in tension to contract the rim, and a heel 49 formed and arranged to engage the inner surface of the rim substantially in the plane of axis of member 13. I have found from experiment that the device will operate more satisfactorily if the pushing heel of the arms is offset slightly below the center line of the thrust which I have indicated by the line 51 in Figure 3 of the drawings and I have consequently formed a small projection 53 to engage the rim at a point below the center of thrust. The thrust surface of the member 29 however, is formed as a plane surface 55 and extends downwardly and completely across the inner surface of the rim.

To operate the device, it is merely necessary to spread the arms 15 and engage the hooks 47 thereof with the side margin of the rim at points substantially opposite the split portion. The member 13 is then adjusted to engage the rim edge adjacent the split portion. By operating the handles to retract the member into the housing, the rim may be contracted by the action of the hooks 47 to break or open the rim. The tool may then be placed with the head 29 at a somewhat greater distance from the break and again operated to further contract the rim as shown in Figure 1 of the drawings and to permit the tire to be removed from the rim. By simply reversing the rotation of the handle 45 to project the member 13 and without shifting or readjusting the parts with respect to the rim, the device may be used to expand the rim, the thrust being transmitted to the rim substantially in the plane of the member 13 which itself lies within the zone of the rim, whereby buckling of the tool is prevented and the tool has a maximum thrust efficiency, none of the energy expended in operating the tool being expended in setting up useless unbalanced forces which have to be absorbed by the tool members instead of acting on the rim.

It will thus be appreciated that, by reason of the construction of my improved rim tool, it has the following advantages, as well as other advantages not hereinafter enumerated; it will collapse into a minimum length tool; it is a single tool for accommodating rims of practically all sizes; it is of small bulk and weight; it has a maximum extensiin line with grooves 32, I am enabled not only to lighten the tool considerably, but also to permit the ears 25 on the extensible member to be guided in these openings, just as the same are guided in the grooves 32.

It is thought that the invention and many of its attendant advantages will be understood from the foregoing description and it will be apparent that various changes may be made in the form, construction, and arrangement of the parts, without departing from the spirit and scope of the invention, or sacrificing any of its material advantages, the form described being merely a preferred embodiment.

Having thus described my invention, what I claim as new and desire to protect by Letters Patent is:

1. In a rim tool, a frame comprising a substantially elongated sleeve, a threaded member adapted for relative axial movement within the sleeve, threaded means rotatably mounted at an end of said sleeve for effecting such movement, said threaded member having a portion adapted to engage a wheel rim and having means formed and arranged therein to cooperate with the sleeve throughout the length thereof to prevent rotation of the threaded member during the axial movement thereof, and rim engaging arms permanently pivoted to said sleeve at points intermediate its ends.

2. In a rim tool, a frame comprising a substantially elongated sleeve, a threaded member normally housed within said sleeve and arranged for extensible and retractable movement with respect to the sleeve, being substantially co-extensive with the sleeve when in retracted position, co-operating means formed in the sleeve and at one end of said member for preventing the relative rotation of the member with respect to the sleeve during the extensible and retractable movements of the member within the sleeve, said member having a rim engaging portion at its opposite end, means carried at one end of said sleeve for effecting extensible and retractable movements of the member within the sleeve and rim engaging arms pivoted to said sleeve at points intermediate its ends.

3. In a rim tool, an enclosing frame comprising an elongated sleeve forming a housing having lateral openings arranged therein whereby to lighten the sleeve without sacrificing its protective function, said sleeve having a groove formed longitudinally thereof in line with said openings, a threaded member housed in the sleeve in position to be projected longitudinally therefrom and having a protruding end at one end of the sleeve, said protruding end being provided with a hooked portion adapted to engage a wheel rim, an integral pin formed on the sleeve adjacent said end, a collar having threaded engagement with the threaded member and having a toothed periphery rotatably carried at one end of the sleeve, a co-operating rotatable member provided with a handle for manipulation and comprising a beveled pinion rotatably mounted to the pin in position to co-operatively engage the collar for rotating the same, means comprising projecting portions carried at the inner end of the threaded member for engaging the longitudinal groove and openings of the sleeve to prevent relative rotation of the threaded member within the sleeve as it is projected therefrom, oppositely extending ears formed externally in said sleeve at points between its ends and arms provided with rim engaging hooked portions at their extremities pivotally mounted to said ears.

4. In a rim tool, a frame comprising an elongated cylindrical sleeve having a groove formed longitudinally thereof and having apertures formed in the sides whereby to lighten the sleeve, an outwardly extending pivot pin formed in the sleeve at one end thereof, oppositely extending ears formed externally in said sleeve at points spaced substantially midway of its length, a threaded extensible member housed within said sleeve and having an end projecting from the sleeve adjacent said pivot pin, said extensible member having a projection extending into said groove, a rim engaging hook mounted to said projecting end, a threaded collar embracing said projecting portion beneath the rim engaging hook, said threaded collar having beveled gear teeth formed peripherally thereof, means formed and arranged at the end of the sleeve for rotatably mounting the threaded collar to the end of the sleeve, a manually operable member rotatably mounted to said pivot pin and comprising a gear provided with an integral handle extending from the body thereof and beveled gear teeth formed in its periphery, said gear teeth being adapted for driving engagement with the gear teeth of the threaded collar, means for securing the manually operable member upon the pivot pin and arms having each a rim engaging hook at one end pivoted each at its other end to an ear.

5. In a rim tool, a shiftable rim-engaging member, a frame comprising an elongated sleeve formed as a pair of cooperating segments arranged to enclose the shiftable member, said frame being substantially coextensive with the shiftable member, connecting means extending between said segments for securing the same together in spaced relationship about the shiftable member, the segments having registering edges secured in spaced relationship to provide a channel therebetween, said connecting portion being arranged at one end of the sleeve and another said connecting portion being arranged at a point spaced from said end whereby to form an elongated perforation in the sleeve defined by the connecting portions and the opposed edges of the segments, said connecting portions being formed whereby the channel extends substantially throughout the sleeve, manually operable means mounted to said sleeve for axially shifting said shiftable member from a position substantially within the zone of the sleeve to a position substantially out of the zone of the sleeve, said shiftable member having a projection extending into the channel whereby to prevent relative rotation of the extensible member within the sleeve at all times during the axial movement of the member and rim engaging arms pivoted to said sleeve intermediate the ends thereof.

In witness whereof, I have hereunto subscribed my name.

ELMER T. RUSHTON.